United States Patent [19]

Ueno et al.

[11] 4,246,136

[45] Jan. 20, 1981

[54] CATALYST COMPONENT FOR USE IN THE POLYMERIZATION OF α-OLEFINS AND A METHOD OF USING THE SAME

[75] Inventors: Hiroshi Ueno, Namekawa; Masafumi Imai; Naomi Inaba, both of Ooi; Makoto Yoda, Kawagoi; Shozo Wada, Zushi, all of Japan

[73] Assignee: Toa Nenryo Kogyo Kabushiki Kaisha, Tokyo, Japan

[21] Appl. No.: 29,082

[22] Filed: Apr. 11, 1979

[30] Foreign Application Priority Data

Apr. 12, 1978 [JP] Japan .................................. 53/42149

[51] Int. Cl.$^3$ ................................................ C08F 4/64
[52] U.S. Cl. ................................ 252/429 B; 526/125; 526/127; 526/142; 526/144; 526/143
[58] Field of Search ..................................... 252/429 B

[56] References Cited

U.S. PATENT DOCUMENTS

| | | | |
|---|---|---|---|
| 3,094,568 | 6/1963 | Hay et al. ..................... | 252/429 B X |
| 4,107,412 | 8/1978 | Welch .......................... | 252/429 B X |
| 4,107,415 | 8/1978 | Giannini et al. .............. | 252/429 B X |
| 4,146,502 | 3/1979 | Yokoyama et al. ............. | 252/429 B |
| 4,156,063 | 5/1979 | Giannini et al. .............. | 252/429 B X |
| 4,157,435 | 6/1979 | Toyota et al. ................ | 252/429 B X |

*Primary Examiner*—Patrick Garvin
*Attorney, Agent, or Firm*—B. C. Cadenhead; M. B. Kurtzman

[57] ABSTRACT

A supported titanium catalyst is produced by cogrinding, in combination, a magnesium halide, tetravalent titanium halide, organic acid ester, and a halogen compound selected from organic halogen compounds and halogen-containing compounds of Group IVa elements of the Periodic Table except carbon, and then treating the resulting titanium-containing solid with a hydrocarbon and/or a halogen compound as described above. The resulting supported titanium catalyst, when employed as a titanium component with an organo aluminum catalyst component for the catalyst system in a process for stereoregular polymerization of α-olefins results in unexpectedly high polymerization activity and high stereoregular polymer yielding ratios.

24 Claims, 2 Drawing Figures

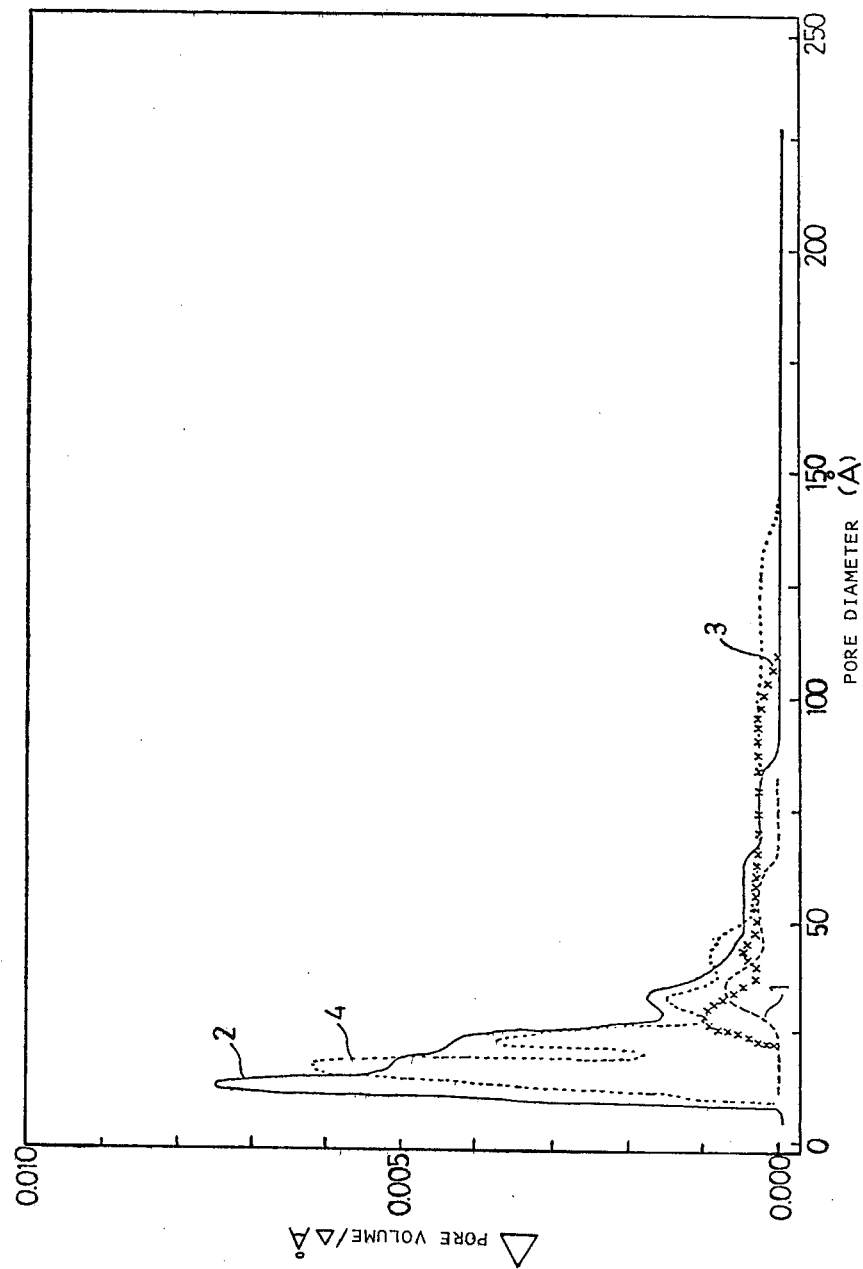

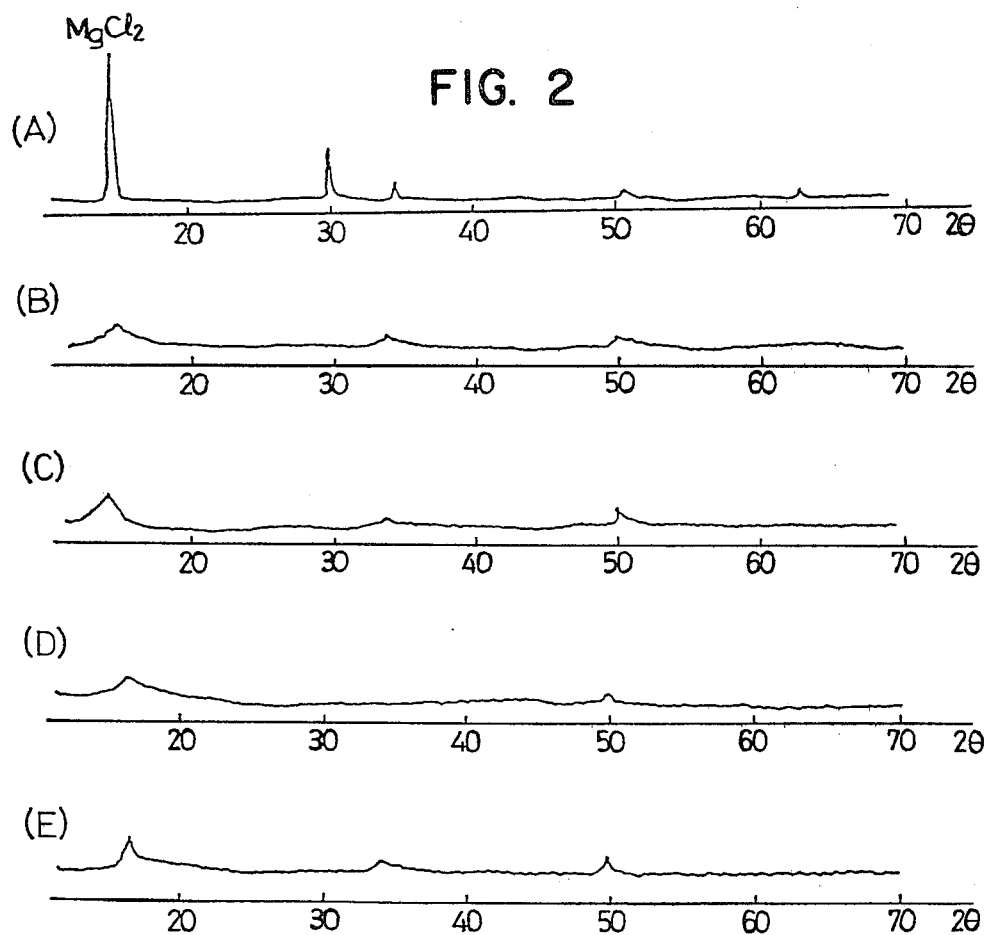

CATALYST COMPONENT FOR USE IN THE POLYMERIZATION OF α-OLEFINS AND A METHOD OF USING THE SAME

BACKGROUND OF THE INVENTION

This invention relates to a catalyst component for use in the polymerization of α-olefins and to a process for the polymerization of α-olefins using the same, and more particularly, it pertains to a supported titanium catalyst component prepared by an improved process and with a process for producing a stereoregular homopolymer or copolymer of α-olefins using a catalyst system comprising the supported titanium catalyst component and an organo aluminum catalyst component.

For the stereoregular polymerization of α-olefins, it has hitherto been carried out to use a catalyst system comprising solid $TiCl_3$, obtained by reducing $TiCl_4$ by various methods, and an organo aluminum compound as cocatalyst. However, this method has many disadvantages on a commercial scale in that both the polymerization activity and stereoregularity of commercially available catalyst systems are low and steps for polymer deashing and for removing amorphous polymers are required. In order to overcome these disadvantages, there have been proposed processes for the polymerization of α-olefins by the use of catalyst systems comprising, by way of example, titanium catalyst components obtained by treating solids, obtained by reducing $TiCl_4$ with organo aluminum compounds, with complexing agents and then with $TiCl_4$ (Japanese Patent Publication No. 3356/1978) or by treating the solids with complexing agents and hexachloroethane (Japanese Patent Public Disclosure No. 107294/1977). In these examples, as far as solid $TiCl_3$ is used, however, only a part of the titanium can be utilized as active catalyst and, consequently, there is not obtained such a high catalytic efficiency as to omit the polymer deashing step.

As a desirable method for raising the polymerization activity per unit titanium, on the other hand, it has been known to disperse and support titanium compounds on other solids. Actually, in the production of polyethylene by middle or low pressure process, a high catalytic efficiency can be achieved by the use of a catalyst system comprising a titanium catalyst component (titanium compounds on various supports) and an organo aluminum compound component. A polymeric product of good quality can be produced on a commercial scale without polymer deashing step. However, in the polymerization of higher α-olefins, e.g., propylene, a high polymerization activity as well as a high stereoregularity are required, resulting in a more difficult problem than in the case of producing polyethylene by middle or low pressure process.

Of late, various improved methods have been proposed as to the stereoregular polymerization of α-olefins using a catalyst system comprising a supported titanium catalyst component and an organo aluminum catalyst component. These methods are classified into two groups depending on the methods of supporting titanium, that is, (I) by cogrinding a support and titanium halide and (II) by suspending a support in a titanium halide and heating the slurry.

Examples of the type (I) are a method comprising using a catalyst system comprising a supported titanium catalyst component, obtained by cogrinding an anhydrous magnesium dihalide and tetravalent titanium halide or complex of a tetravalent titanium halide and, an electron donating compound, and an organo aluminum catalyst component consisting of an organo aluminum compound and electron donating compound (Japenese Patent Public Disclosure Nos. 16986-8/1973); a method comprising using a catalyst system composed of a supported titanium catalyst component obtained in a similar manner as set forth above except the cogrinding of materials is carried out in the presence of an organic solid such as durene, hexachlorobenzene or polyolefin and an inorganic solid such as lithium chloride, calcium chloride or alumina, which are substantially inert to the other compounds for composing the catalyst, and an organo aluminum catalyst component consisting of a trialkylaluminum and an electron donating compound (Japanese Patent Public Disclosure No. 86482/1974); and a method comprising using, in combination, a supported titanium catalyst component, obtained by cogrinding a magnesium alkoxide, titanium tetrahalide, electron donating compound and halosilane, and an organo aluminum catalyst component consisting of an organo aluminum compound and electron donating compound (Japanese Patent Public Disclosure No. 98076/1977).

These catalyst systems have an advantage in that titanium compounds can effectively be utilized and handling thereof is easy, but, on the other hand, a long time is required for grinding. In addition, as set forth in Japanese Patent Public Disclosure No. 16986/1973, the supported titanium catalyst obtained has a small surface area and gives unsatisfactory results in overall polymerization activity and stereoregularity sufficient for omitting the steps for polymer deashing and removing amorphous polymers in a polyolefin commercial operation.

Examples of the type (II) are a method comprising ball milling an anhydrous magnesium halide and an electron donating compound (and silicon compound), contacting the ball milled product with a titanium halide with heating to support the titanium and using a catalyst system comprising the thus resulting supported titanium catalyst component, an organo aluminum compound and electron donating compound (Japanese Patent Public Disclosure No. 151691/1977); a method comprising using, in combination, a supported titanium catalyst component prepared by cogrinding, prior to slurry supporting of titanium, an anhydrous magnesium halide and electron donating compound with a halosilane (Japanese Patent Public Disclosure Nos. 108385/1975 and 98076/1977); a polysiloxane (Japanese Patent Public Disclosure No. 20297/1976); a tin or germanium compound (Japanese Patent Public Disclosure No. 87489/1977); or an alcohol of $C_6$ or more (Japanese Patent Public Disclosure No. 104593/1977); and an organo aluminum catalyst component.

The type (II) catalyst systems have the advantage that supporting of titanium does not require a long time for the preparation of the supported catalyst component, but on the other hand, has the disadvantage on a commercial scale that because of using a titanium halide in excess, steps of recovering, purifying the same, etc. are required. Furthermore, in the polymerization of α-olefins using the above-described catalyst system, in particular, in the presence of a molecular weight regulator, a number of problems as to both the polymerization activity and stereoregularity are retained with some exceptions. There has further been proposed a method comprising using a catalyst consisting of a supported titanium catalyst component prepared by supporting a titanium tetrahalide by $MgX_2 \cdot mROH$ under a slurry state and treating the resulting titanium-containing solid with a solution of an organic acid ester (Japanese Patent Public Disclosure No. 57789/1976), but this method is also insufficient for eliminating polymer deashing.

SUMMARY OF THE INVENTION

The inventors have made various studies to solve the above-described problems as to the catalyst system for the polymerization of α-olefins and, consequently, have completed the present invention. That is to say, the present invention provides a polymerization catalyst component having such a high polymerization activity that the resultant polymer is not affected by the catalyst component or at least, such a bad influence is remarkably reduced, as well as such a high stereoregularity that removal of amorphous polymers is unnecessary or lightened to a great extent. Moreover, in accordance with the present invention, there is provided a commercially available process for the homopolymerization or copolymerization of α-olefins with a high polymerization activity and excellent stereoregularity even in the presence of a molecular weight regulator by the use of a catalyst system composed of (i) a supported titanium catalyst component, prepared by deriving a titanium-containing solid from cogrinding a magnesium halide, preferably anhydrous magnesium dihalide, an organic acid ester, tetravalent titanium halide and an halogen compound selected from the group consisting of organo halogen compounds and halogen-containing compounds of Group IVa elements of Periodic Table except carbon or having skeletons of the elements and treating the resulting titanium-containing solid with a hydrocarbon and/or a halogen compound selected from the group consisting of organo halogen compounds and halogen-containing compounds of Group IVa elements of Periodic Table, except carbon, with heating, to thus obtain a supported titanium catalyst component with different composition, properties and reactivity from those before the treatment, and (ii) an organo aluminum catalyst component consisting of an organo alumium compound and organic acid ester.

BRIEF DESCRIPTION OF THE DRAWING

FIG. 1 is a diagram illustrating the pore distribution of supported titanium catalyst components, in which Curve 1 shows the case of the titanium-containing solid prepared in Example 1 before an activation treatment, Curve 2 shows the case of the supported titanium catalyst produced in Example 1, Curve 3 shows the case of the titanium-containing solid before the activation treatment in Comparative Example 3 and Curve 4 shows the case of titanium catalyst prepared in Comparative Example 3.

FIG. 2 is a diagram illustrating X-ray diffractions in which (A) shows the case of $MgCl_2$, (B) shows the case of the titanium-containing solid before the activation treatment in Example 1, (C) shows the case of the supported titanium catalyst of Example 1, (D) shows the case of the titanium-containing solid before the activation treatment in Comparative Example 3 and (E) shows the case of the supported titanium catalyst of Comparative Example 3.

DETAILED DESCRIPTION OF THE INVENTION

The components used for the preparation of the catalyst component according to the present invention will now be illustrated:

As the magnesium halide, in particular, magnesium dihalide of the present invention, there are ordinarily used $MgCl_2$, $MgBr_2$ and $MgI_2$. Above all, $MgCl_2$ is preferably used. These anhydrous magnesium dihalides may be those synthesized by any methods and commercially sold compounds can, of course, be used. It is desirable that the magnesium dihalides be as anhydrous as possible and prior to their use, they are subjected to a dehydration treatment in conventional manner, for example, by firing (calcining, baking) at a temperature of 100° to 400° C. under reduced pressure for 1 to 10 hours, but the presence of water in such an extent that the catalytic performance is not affected is allowed.

Typical examples of the tetravalent titanium halide used in the present invention are $TiCl_4$, $TiBr_4$ and $TiI_4$. However, it is not always necessary that all the anions of these titanium halides are halogens, but a part thereof can be substituted by alkoxy, acyloxy or alkyl groups. Of course, $TiCl_4$ is preferred for catalyst components for use in stereoregular (co)polymerization of higher α-olefins, e.g., propylene.

The organic acid esters used in the present invention are esters of saturated or unsaturated aliphatic, alicyclic and aromatic mono- or polycarboxylic acids and aliphatic, alicyclic and araliphatic mono- or polyols. Examples of these esters are butyl formate, ethyl acetate, butyl acetate, ethyl acrylate, ethyl butyrate, isobutyl isobutyrate, methyl methacrylate, diethyl maleate, diethyl tartrate, ethyl hexahydrobenzoate, ethyl benzoate, ethyl p-methoxybenzoate, methyl p-methylbenzoate, ethyl p-tertbutylbenzoate, dibutyl phthalate, diallyl phthalate and ethyl α-naphthoate. The organic acid esters of the present invention are not intended to be limited to these examples. Above all, alkyl esters of aromatic carboxylic acids, in particular, $C_1$ to $C_8$ alkyl esters of benzoic acid or derivatives thereof are preferably used.

Typical examples of the organic halogen compound which may be used in the cogrinding step in accordance with the present invention are halogen-substituted hydrocarbons, i.e., mono- and polyhalo substituted products of saturated or unsaturated aliphatic, alicyclic hydrocarbons and aromatic hydrocarbons having 1 to 20 carbon atoms. For example, aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, 1,1,2-trichloroethylene, 1,1,2-tribromoethylene, 1,1,2,2-tetrachloroethylene, pentachloroethane, hexachloroethane, hexabromoethane, n-propyl chloride, 1,2-dichloropropane, hexachloropropylene, octachloropropane, decabromobutane and chlorinated paraffins. Alicyclic compounds include chlorocyclopropane, tetrachlorocyclopentane, hexachloropentadiene and hexachlorocyclohexane. Aromatic compounds include chlorobenzene, bromobenzene, o-dichlorobenzene, p-dichlorobenzene, hexachlorobenzene, benzotrichloride, hexabromobenzene and p-chlorobenzotrichloride. The present invention is not intended to be limited thereby.

In addition to these halo-substituted hydrocarbons, it is possible to use halo-substituted oxygen-containing compounds, for example, hexachloroacetone, chloroacetic acid esters, trichloroacetic acid esters and the like.

As the halogen-containing compound of Group IVa elements of Periodic Table, except carbon which may be used there are halogen compounds of silicon, germanium, lead or their homologues. Additionally, halogen-containing compounds having skeletons of such Group IVa elements may be used.

Typical examples of the halogen compound of silicon represented by the general formula $Si_mX_{2m+2}$, where m is generally an integer of 1 to 10, are polyhalosilanes such as tetrahalosilanes, hexahalodisilanes, octahalotrisilanes, decahalotetrasilanes, dodecahalopentasilanes, tetradecahalosilanes, docosahalodecasilanes and the like. In these polyhalosilanes, the halogen atoms may be same or different. Above all, preferable of these compounds are tetrahalosilanes corresponding to m=1 in the general formula, for example, tetrachlorosilane, tetrabromosilane, tetraiodosilane, trichlorobromosilane, trichloroiodosilane, trichlorofluorosilane, dichlorodibromosilane, dichlorodiiodosilane, chlorotribromosilane, chlorotriiodosilane and tribromoiodosilane. Tetrachlorosilane is most preferable because of it being readily obtainable on a commercial scale. Moreover, a part of the halogens in the above described halosilane homologues can be replaced by one or more of alkyl, aryl, aralkyl, vinyl, alkoxy and acyl groups.

Typical examples of the halogen compound of germanium, represented by the general formula $GeX_m$, wherein X is a halogen and m is an integer of 2 or 4, are $GeCl_2$, $GeBr_2$, $GeI_2$, $GeCl_4$, $GeBr_4$ and $GeI_4$. Particularly, $GeCl_2$ and $GeCl_4$ are preferably used. A part of the halogens in the above-described halogermanium compounds can be replaced by one or more of alkyl, aryl, aralkyl, vinyl, alkoxy and acryl groups.

Typical examples of the halogen compound of tin, represented by the general formula $SnX_m$ wherein X and m have the same meanings as described above, are $SnCl_2$, $SnBr_2$, $SnI_2$, $SnCl_4$, $SnBr_4$, $SnI_4$, $SnCl_3Br$, $SnCl_2Br_2$, $SnBr_3Cl$, $SnBr_2I_2$, and $SnCl_2I_2$. Particularly, $SnCl_2$ and $SnCl_4$ are preferably used. As part of the halogens in the above-described halotin compounds can be replaced by one or more of alkyl, aryl, aralkyl, vinyl, alkoxy and acyl groups.

Of the halogen compounds of Group IVa elements of Periodic Table as set forth above, organo halogen compounds and halosilane compounds are most preferably used.

Typical examples of the halogen compound of lead, represented by the general formula $PbX_m$, wherein X and m have the same meanings as described above, are $PbCl_2$, $PbCl_4$, $PbBr_2$, $PbBr_4$, $PbI_2$ and $PbI_4$. Particularly, $PbCl_2$ and $PbCl_4$ are preferably used. A part of the halogens in the above-described halolead compounds can be replaced by one or more of alkyl, aryl, aralkyl, vinyl, alkoxy and acyl groups.

These halo compounds can be used individually or in combination.

Above all, however, polyhalo-substituted hydrocarbons, in particular, polychloro-substituted products of aliphatic hydrocarbons having 1 to 4 carbon atoms are preferably used as the halogen compound in the present invention. Most preferably, carbon tetrachloride, 1,1,2-tetrichloroethylene, 1,1,2,2-tetrachloroethane, hexachloroethane and octachloropropane are used. As exemplified hereafter, hexachloroethane has provided the most consistent superior results.

The preparation of the titanium-containing solid in the cogrinding step of the present invention is generally carried out as follows:

The titanium-containing solid is obtained by subjecting (a) anhydrous magnesium dihalide, (b) tetravalent titanium halide, (c) organic acid ester and (d) organo halogen compound to a cogrinding and/or contacting treatment in various manners. This is, in the production thereof, the adding methods and contacting orders of these compounds can suitably be varied, but it is required that all of these compounds are finally brought into contact with each other. The cogrinding and/or contacting treatment is preferably carried out as to the following systems each consisting of a combination of these compounds and, more preferably, is carried out by mechanical grinding using a vibration mill, ball mill, etc.:

(i) mixtures of (a), (b), (c) and (d),
(ii) mixtures of (b), (d) and a complex (e) formed previously from (a) and (c),
(iii) mixtures of (a), (d) and a complex (f) formed previously from (b) and (c),
(iv) mixtures of (b), (c) and a complex (g) formed previously from (a) and (d),
(v) mixtures of (f) and (g),
(vi) mixtures of (e), (f) and (d),
(vii) mixtures of (a), (f) and (d), and
(viii) mixtures of (d) and a complex (h) formed previously from (a) and (f).

Above all, a method for forming previously a complex is preferably selected from wet process or dry process mechanical grinding treatments and contacting treatments in the presence or absence of a solvent at room temperature or with heating, and each of the mixtures can be prepared by mixing the components at a time or in order.

In the present invention, it is necessary to effect grinding until there is produced a change of intensity in the peaks of 14.8° (strong) and 30.2° (middle) of the characteristic peaks (2θ) in the X-ray diffraction (45 KV×45 mA, CuKα source, Ni filter) of anhydrous magnesium chloride used as a support, although the mechanical grinding efficiency depends on the grinding system, the structure of a grinding apparatus, the quantity of starting materials charged, voids, temperature, etc. More preferably, the grinding is carried out in such an extent that the peak of 14.8° becomes dull with an increased width and the other peak of 30.2° loses its intensity to a great extent. In the case of charging 10 to 50 g of a mixture in a vibration mill of 300 ml in inner volume, having 100 steel balls of 10 m/m diameter, and grinding at a vibration width of 1 to 3 m/m and a vibration number of 1400 vpm, for example, the grinding time is usually 1 to 200 hours, preferably 10 to 100 hours and most preferably, about 20 to about 48 hours.

The quantity of a titanium halide on a support is preferably 0.1 to 10% by weight as titanium metal. An organic acid ester is preferably used in a proportion of 0.1 to 10 mols, particularly, 0.5 to 5 mols to 1 gram atom of the supported titanium metal and halogen compound is preferably used in a proportion of 1 to 100% by weight, particularly, 5 to 50% by weight to the anhydrous magnesium halide.

It is surprisingly found that according to the above-described method, a complex composed of (a), (b), (c) and (d) can be obtained in the form of a flowable solid even if the above-described halogen compound used is liquid. The titanium-containing solid obtained in this way has a very small surface area and pore volume.

The activation treatment of the titanium-containing solid according to the present invention will hereinafter be described. The activation treatment is accomplished by the use of a hydrocarbon and/or at least one compound selected from the group consisting of organo halogen compounds and halogen compounds containing Group IVa elements of Periodic Table (tetravalent), except carbon.

Hydrocarbons which may be used in the present invention are dehydrated in conventional manner and include aliphatic hydrocarbons having 3 to 20 carbon atoms, such as propane, butane, isobutane, pentane, n-hexane, n-heptane, isooctane, decane and liquid paraffins, alicyclic hydrocarbons having 5 to 12 carbon atoms, such as cyclopentane, cyclohexane, methylcyclohexane, ethylcyclohexane, decalin, and dimethyldecalin, and aromatic hydrocarbons having 6 to 12 carbon atoms, such as benzene, toluene, o-xylene, p-xylene, m-xylene, mixed xylenes, ethylbenzene, dimethylnaphthalene and tetralin, gasoline and kerosene.

The halogen compounds of Group IVa elements (IV) and organo halogen compounds which may be used in the activation treatment are suitably chosen from the above-described scopes and may be same as or different from those used in the cogrinding treatment.

These hydrocarbons and halogen compounds containing Group IVa elements (IV) can be used individually or in combination and prior to use, they are preferably subjected to a dehydrating treatment in conventional manner.

The activation treatment of the titanium-containing solid with these hydrocarbons and/or halogen compounds of Group IVa elements (IV) is preferably carried out in a nitrogen atmosphere. The amounts of the hydrocarbons and/or halogen compounds of Group IVa elements (IV) used in the activation treatment of the titanium-containing solid can be varied within a wide range and, in general, the former is in a proportion of 5 to 50 times and the latter is in a proportion of 0.5 to 50 times, as much as the weight of the titanium-containing solid. The activation may be carried out at room temperature, but it is carried out by heating ordinarily at 40° to 200° C., preferably 80° to 150° C. When materials for the treatment have low boiling points and the treatment must be carried out a high temperature, in particular, it is preferable to use an air-tight pressure vessel such as an autoclave. The treatment time can be varied within a wide range, but it is ordinarily about 0.5 to 20 hours, preferably about 1 to about 5 hours.

After the treatment, the solution is separated by filtration at a temperature somewhat lower than the treatment temperature and the titanium-containing solid is rinsed several times with a fresh hydrocarbon solvent such as n-heptane while holding this temperature, followed by drying under reduced pressure.

During the activation treatment step of the present invention the most part of the component (e) and a part of the components (b) and (c) are extracted from the titanium-containing solid to change the composition. The selectivity of the extraction can also be varied with materials used for the activation treatment.

On the other hand, the supported titanium catalyst component is subjected to a large change in physical properties by the above-described activation treatment. That is to say, pores are newly formed by the treatment thus to increase largely the surface area and pore volume. In the X-ray analysis (50 KV×45 mA, CuK$_\alpha$, Ni filter) as shown in FIG. 2, a part of the characteristic absorption of the starting anhydrous magnesium halide loses its sharpness in the titanium-containing solid obtained by mechanical grinding, so that the intensity is decreased, the width is enlarged and a peak of the peaks disappear. However, in the supported titanium catalyst component obtained by the activation treatment according to the present invention, there are found various features that the peak which sharpness is lost with a decreased intensity and an enlarged width recovers again its sharpness to some extent and a part of the peaks disappearing once is recovered, which means that the resulting treated supported titanium catalyst component completely differs in properties from that before the treatment is performed. Such a marked modifying effect cannot be given by subjecting the titanium-containing solid obtained by mechanical grinding or the like to a heat treatment only.

The supported titanium catalyst component thus remarkably modified in composition and physical properties, in combination with an organo aluminum catalyst component, is capable of exhibiting effectively a performance to give a high activity as well as a high stereoregularity in the homopolymerization of α-olefins or copolymerization with ethylene or other α-olefins.

As an organo aluminum compound for the above-described organo aluminum catalyst component there is used ordinarily an organo aluminum compound represented by the general formula R$_m$AlX$_{3-m}$, wherein R represents an alkyl group or aryl group having 1 to 18 cabon atoms, X represents a halogen atom, alkoxy group or hydrogen atom and m represents a suitable numeral within a range of $2 < m \leq 3$, or a mixture or complex compound thereof. For example, trialkylaluminums are used. There are preferably used as an organo aluminum compound to be used jointly with the trialkylaluminums, alkylaluminum compounds having 1 to 18 carbon atoms, in particular, 2 to 6 carbon atoms, such as dialkylaluminum monohalides, monoalkylaluminum dihalides, alkylaluminum sesquichlorides, dialkylaluminum monoalkoxides and dialkylaluminum monohydrides, or mixtures or complex compounds thereof. Examples of preferred trialkylaluminums are trimethylaluminum, triethylaluminum, tripropylaluminum, triisobutylaluminum and trihexylaluminum. Examples of preferred dialkylaluminum monohalides are dimethylaluminum chloride, diethylaluminum chloride, diethylaluminum bromide, diethylaluminum iodide and diisobutylaluminum chloride. Examples of preferred monoalkylaluminum dihalides are methylaluminum dichloride, ethylaluminum dichloride, ethylaluminum dibromide, ethylaluminum diiodide and isobutylaluminum dichloride. An example of a preferred alkylaluminum sesquihalide is ethylaluminum sesquichloride. Examples of the dialkylaluminum monoalkoxides are dimethylaluminum methoxide, diethylaluminum ethoxide, diethylaluminum phenoxide, dipropylaluminum ethoxide, diisobutylaluminum ethoxide and diisobutylphenoxide. Examples of dialkylaluminum hydrides are dimethylaluminum hydride, diethylaluminum hydride, dipropylaluminum hydride and diisobutylaluminum hydride. In particular, it is preferable to use triethylaluminum, triisobutylaluminum and as one to be used jointly with them, diethylaluminum chloride, ethylaluminum dichloride, ethylaluminum sesquichloride, diethylaluminum ethoxide and diethylaluminum hydride, or mixtures or complex compounds thereof, because these compounds are readily obtainable commercially and exhibit excellent effects.

When the above-described organo aluminum compound only is used with the supported titanium catalyst component for the polymerization of α-olefins in the presence of a molecular weight regulator such as hydrogen, however, the yield of a stereoregular polymer is remarkably decreased. This is disadvantageous commercially. Therefore, the above-described organo aluminum compound and an organic acid ester, in combination, are preferably used as the organo aluminum catalyst component of the present invention. A suitable organic acid ester may be same as or different from used for the preparation of the supported titanium catalyst component and their ratio is chosen within a range of 0.1 to 10 gram atoms, preferably 1 to 5 gram atoms of Al per 1 mol of organic acid ester.

Preparation of such a complex is carried out by contacting an organo aluminum compound and organic acid ester, for example, by merely mixing them at room temperature or while using a suitable hydrocarbon, as set forth above, as a diluent. The organo aluminum catalyst component is ordinarily prepared before a polymerization reaction, but, in general, it is preferably used within 1 hour after the component is prepared since the stereoregularity is unfavorably affected if it is used after storage of the complex for a long time.

The catalyst system of the present invention can be used for the polymerization of α-olefins, in particular, for the stereospecific polymerization of α-olefins having 3 to 6 carbon atoms, for example, propylene, butene-1,4-methyl-pentene-1 and hexene-1 and for the copolymerization of α-olefins with each other and/or with ethylene. This copolymerization includes random copolymerization and block copolymerization. In the case of using ethylene as a comonomer, its proportion is generally chosen within a range of up to 30% by weight, in particular, 1 to 15% by weight to α-olefins. A polymerization reaction using the catalyst system of the present invention is carried out under ordinary conventional polymerization conditions. The reaction can be carried out in any of a gaseous phase and liquid phase, and for the reaction of liquid phase, any of inert hydrocarbons and liquid monomers can be used. A suitable solvent for the polymerization is selected from the foregoing hydrocarbons. The polymerization temperature is generally −80° C. to 150° C., preferably 40° to 100° C. The pressure ranges, for example, 1 to 40 atm. Control of the molecular weight during polymerization is carried out in conventional manner using hydrogen or other known molecular weight regulators.

The polymerization can be carried out continuously or batchwise. The organo aluminum catalyst component is, of course, utilized for the polymerization reaction and further serves to catch various catalyst poisons introduced into the system. Thus, it is necessary to control the additive quantity of the organo aluminum catalyst component considering the quantities of catalyst poisons contained in α-olefins, solvents or various gases, in particular, when using a high activity catalyst as in the present invention, and, ordinarily, the organo aluminum catalyst component is used so as to satisfy and Al/Ti atomic ratio of 1 to 2000, preferably 50 to 1000 based on titanium in the supported titanium catalyst component.

When stereoregular polymerization is carried out according to the process of the present invention, the polymerization activity and stereoregularity are largely improved and, consequently, the steps of removing the catalyst (polymer deashing) and removing atactic polymers become unnecessary or the load thereon is markedly reduced. The process of the present invention is particularly important for the production of isotactic polypropylene, random copolymers of ethylene and propylene and block copolymers of propylene and ethylene.

The present invention will now be illustrated in detail by the following examples without limiting the same, in which percents are to be taken as those by weight unless otherwise indicated. The polymerization activity or catalyst efficiency (which will hereinafter be referred to as "C.E.") is the quantity (g) of a polymer formed per 1 g of titanium in the catalyst. The heptane-insoluble component (which will hereinafter be referred to as "H.I.") to show the proportion of a crystalline polymer in the polymers means the residual quantity (% by weight) in the case of extracting the polymer product with boiling n-heptane for 6 hours by means of a Soxhlet extractor of an improved type. The melt flow rate (which will hereinafter be referred to as "M.F.R.") is measured according to ASTM-D 1238.

EXAMPLE 1

Preparation of Titanium-Containing Solid 28.7 g (64%) of anhydrous magnesium chloride (moisture content: 1% or less), 7.7 g (17%) of an equimolar complex of titanium tetrachloride and ethyl benzoate (which will hereinafter be referred to as "E.B.") and 8.4 g (19%) of hexachloroethane were charged in a stainless steel (SUS 32) mill pot with an inner volume of 300 ml carrying 100 stainless steel (SUS 32) balls with a diameter of 10 mm in a nitrogen atmosphere, which was then fitted to a shaker, followed by shaking for 20 hours to cogrind them. The thus obtained titanium-containing solid was yellow and had a composition of 16.3% Mg, 74.7% Cl, 6.8% E.B. and 2.2% Ti. The specific surface area of the solid measured by the BET method was 5.2 m$^2$/g and the pore volume was 0.016 cc/g, the distribution of the pores being as shown in FIG. 1 (FIG. 1, Curve 1). X-ray diffraction analysis (45 KV×45 mA, CuK$_\alpha$, Filter Ni) showed, as shown in FIG. 2, that the peaks of 14.8° and 34.8° of the characteristic peaks (2θ) of anhydrous magnesium chloride became dull with increased widths and the peaks of 30.2° and 63° disappeared, while there was scarecely found a change in the peak of 50.3° (FIG. 2 (B)).

Activation Treatment 5.2 g of the above-described titanium-containing solid was charged in a glass vessel of 300 ml in a nitrogen atmosphere, to which 8.1 g of hexachloroethane equimolar to Mg and 50 ml of n-heptane were added, followed by stirring at a temperature of 90° C. for 2 hours. Then, the solution was separated at 65° C. by filtration and the solid was rinsed four times with fresh n-heptane with holding the same temperature, followed by drying under reduced pressure. The thus obtained solid being light yellow had a composition of 22.5% Mg, 69.2% Cl, 7.1% E.B. and 1.2% Ti and contained only a trace (less than 0.2%) of hexachloroethane which had been contained in the titanium-containing solid. The surface area measured by the BET method was 172 m$^2$g/ and the pore volume was increased to 0.13 cc/g, the former corresponding to 30 times and the latter corresponding to 8 times as much as those of the titanium-containing solid before the treatment. This is due to pores having a pore diameter of 25 Å or less being newly formed by this treatment as shown in the pores distribution diagram of FIG. 1 (FIG. 1, Curve (2)). As shown in the X-ray diffraction diagram of FIG. 2, the peaks of 14.8° and 50.3°, which became dull by the cogrinding treatment, tend to recover somewhat the sharpness (FIG. 2, (C)).

COMPARATIVE EXAMPLE 1

A sample of titanium-containing solid prepared in Example 1 was subjected to a heat treatment at 90° C. for 2 hours in a nitrogen atmosphere. After the treatment, the yellow color of the solid was not changed and the Ti content was hardly changed, i.e., 2.1%. The surface area measured by the BET method was 6.3 m$^2$/g and the pore volume was 0.016 cc/g, which were substantially similar to before the treatment.

COMPARATIVE EXAMPLE 2

Preparation of Titanium-Containing Solid 40.3 g of anhydrous magnesium chloride and 11.1 g of an equimolar complex of titanium tetrachloride and ethyl benzoate (dehydration with CaH$_2$, nitrogen-substituted moisture content: 0.4%) were charged in a stainless steel (SUS 32) mill pot with an inner volume of 300 ml carrying 100 stainless steel (SUS 32) balls with a diameter of 10 mm in a nitrogen atmosphere, which was then fitted to a shaker, followed by shaking for 20 hours to cogrind them. The thus obtained titanium-containing solid was yellow and had a composition of 20.5% Mg, 2.9% Ti, 68.4% Cl and 8.4% E.B. The specific surface area of the solid measured by the BET method was 10.8 m$^2$/g and the pore volume was 0.032 cc/g, the distribution of the pores being shown in FIG. 1 (Cf. FIG. 1, Curve (3)). The results of X-ray diffraction of the solid gave a similar pattern to the titanium-containing solid of Example 1 except that the peak of 34.8° disappeared (FIG. 2 (D)).

Activation Treatment 7.7 g of the above-described titanium-containing solid was charged in a glass vessel of 300 ml, to which a solution of 7.5 g of hexachloroethane equimolar to the magnesium dichloride in the titanium-containing solid in 77 ml of deoxidized dry n-heptane was added, and the mixture was stirred at 90° C. for 2 hours by means of a magnetic stirrer. Then, the mixture was subjected to filtration at 65° C. to separate soluble materials, washed repeatedly 4 times with 70 ml of fresh n-heptane while keeping the same temperature and dried under reduced pressure, thus obtaining a light yellow solid with a yield of 92%. The so obtained solid had a composition of 22.2% Mg, 68.4% Cl, 8.2% E.B. and 1.2% Ti. The surface area and pore volume of the solid were respectively 133 m$^2$/g and 0.12 cc/g, which were respectively 12 times and 3.2 times as much as those of the titanium-containing solid before the activation treatment. The distribution of pores is shown in FIG. 1 from which it is seen that a considerable number of pores are newly formed (FIG. 1, Curve (4)). The X-ray diffraction diagram is as shown in FIG. 2. As can be seen from this diagram, both the peaks of 14.8° and 50.3°, which widths were increased and became dull by cogrinding, recover somewhat the sharpness and a peak with a large width reappears near 34.8° (FIG. 2 (E)).

These results are similar to those of Example 1, but the surface area and pore volume are smaller than those of Example 1. This difference appears clearly in the pore distribution of FIG. 1.

As apparent from the comparison of Example 1 and Comparative Example 1, a mere heating treatment has little effect on the titanium-containing solid, but a combination of heating and using an organo halogen compound in the activation treatment results in a marked structural change in the titanium-containing solid in a short time. In addition, it is apparent from comparing Example 1 and Comparative Example 2 that the presence of hexachloroethane during cogrinding results in a marked change. It is difficult to illustrate clearly how the change before and after the activation treatment is caused by the structural change in the titanium-containing solid, but this is considered to be possibly due to occurence of active points useful for the polymerization activity and stereoregularity.

EXAMPLE 2

Preparation of Titanium-Containing Solid 23.7 g (60.8%) of anhydrous magnesium chloride, 8.3 g (21.3%) of an equimolar complex of titanium tetrachloride and ethyl benzoate and 7.0 g (17.9%) of hexachloroethane were charged in the same mill pot as that of Example 1 and subjected to cogrinding for 44 hours, thus obtaining a yellow titanium-containing solid having a Ti content of 2.5%.

Activation Treatment (1)

The activation treatment of Example 1 was repeated except using the above-described product coground for 44 hours in place of the product coground for 20 hours, thus obtaining a light yellow solid with a Ti content of 1.6%.

Activation Treatment (2)

The procedure of Activation Treatment (1) was repeated except for using a treatment temperature of 120° C. in place of 90° C., thus obtaining a light yellow solid having a Ti content of 1.2%.

Polymerization Examples 1–8 and Comparative Polymerization Example 1–7

Polymerization tests were carried out by mixing previously a titanium catalyst component, a 1 mol/l solution of a certain amount of organo aluminum compound and ethyl benzoate, holding the mixture for 5 minutes and adding in a nitrogen atmosphere to a stainless steel (SUS 32) autoclave of 1000 ml in inner volume, equipped with a stirrer, to which 0.6 l of hydrogen gas as a molecular weight regulator and 0.1 l of liquid propylene were forcedly added under pressure, and then raising the temperature of the system to 68° C. to effect the polymerization for 30 minutes. After the polymerization, the unreacted propylene and hydrogen gas were purged to obtain polypropylene.

In Tables I and II are shown the polymerization results using the catalyst systems composed of the various titanium catalyst components prepared in Examples 1 to 2 and Comparative Examples 1 to 2 and various organo aluminum catalyst components, all as specified in solid Tables I and II. As evident from the data in these Tables, the catalysts of the present invention give high H.I., i.e., 94 to 97% measured as to powdered PP and high C.E. which is sufficient for use without polymer deashing. Furthermore, it is to be noted that a halogen-containing organo aluminum compound such as diethylaluminum chloride can be used in the organo aluminum catalyst component.

Activation Treatment

The activation treatment of Example 1 was repeated except using the above-described titanium-containing solid, thus obtaining a light yellow solid containing 1.5% of Ti.

TABLE I

| Polymerization Example No. | 1 | 2 | 3 | 4 | 5 | 6 | 7 | 8 |
|---|---|---|---|---|---|---|---|---|
| Ti Cat Component | | | | | | | | |
| Preparation Ex. No. | Ex. 1 | Ex. 1 | Ex. 1 | Ex. 1 | Ex. 1 | Ex. 1 | Activation Treatment (1) | Activation Treatment (2) |
| Ti Support Ratio (%) | 1.2 | 1.2 | 1.2 | 1.2 | 1.2 | 1.2 | 1.6 | 1.2 |
| Amount of Cat Used (mg) | 37.3 | 29.9 | 31.4 | 32.0 | 28.4 | 32.8 | 29.8 | 34.6 |
| Organo Al Cat Component | | | | | | | | |
| Organo Al Compound | TIBAL | TEAL | TIBAL | TIBAL/TEAL (1:1) | TIBAL/TEAL (1:1) | DEAC/TEAL (1:1) | TIBAL | TIBAL |
| Al/Ti (molar ratio) | 300 | 300 | 300 | 300 | 300 | 300 | 300 | 300 |
| Al/E.B. (molar ratio) | 2.3 | 3.4 | 3.4 | 0.85 | 3.4 | 3.4 | 3.4 | 3.4 |
| Polymerization Results | | | | | | | | |
| C.E. (PP Kg/g-Ti) | 235 | 407 | 242 | 334 | 255 | 328 | 241 | 144 |
| H.I. (%) | 94.9 | 87.0 | 94.0 | 91.3 | 91.0 | 91.6 | 94.4 | 97.0 |
| M.F.R. | 3.1 | 2.5 | 3.5 | 3.1 | 3.5 | 3.3 | 2.8 | 2.8 |

Note:
TEAL = Triethylaluminum; TIBAL = Triisobutylaluminum; DEAC = Diethylaluminum Chloride

TABLE II

| Comparative Polymerization Example No. | 1 | 2 | 3 | 4 | 5 | 6 | 7 | 8 |
|---|---|---|---|---|---|---|---|---|
| Ti Cat Component | | | | | | | | |
| Preparation Ex. No. | Ex. 1; Ti-containing solid | Ex. 1 | Comp. Ex. 1 | Comp. Ex. 2; Ti-containing solid | Comp. Ex. 2; Ti-containing solid | Comp. Ex. 2 | Comp. Ex. 2 | Ex. 2; Ti-containing solid |
| Ti Support Ratio (%) | 2.2 | 2.2 | 2.1 | 2.9 | 2.9 | 1.2 | 1.2 | 2.5 |
| Amount of Cat Used (mg) | 46.5 | 35.1 | 35.5 | 36.1 | 33.5 | 47.9 | 41.2 | 40.2 |
| Organo Al Cat Component | | | | | | | | |
| Organo Al Compound | TIBAL | TEAL | TIBAL | TEAL | TIBAL | TEAL | TIBAL | TIBAL |
| Al/Ti (molar ratio) | 300 | 177 | 300 | 177 | 300 | 300 | 300 | 300 |
| Al/Ester (molar ratio) | 3.4 | 3.4 | 3.4 | 3.4 | 3.4 | 3.4 | 3.4 | 3.4 |
| Polymerization Results | | | | | | | | |
| C.E. (PP Kg/g-Ti) | 114 | 128 | 95 | 115 | 94 | 203 | 197 | 157 |
| H.I. (%) | 89.6 | 90.1 | 83.5 | 86.5 | 86.0 | 90.4 | 92.3 | 91.2 |
| M.F.R. | 2.8 | 2.5 | 2.9 | — | — | — | — | — |

EXAMPLE 3

Preparation of Titanium-Containing Solid

Preparation of a titanium-containing solid was carried out by repeating the procedures of Example 2 (Components, Ratio thereof, Pot Mill, etc.) except changing the contacting method as in the following:

Firstly, the anhydrous magnesium chloride and ethyl benzoate were charged in the mill pot and subjected to a previous cogrinding treatment for 3 hours. Then the hexachloroethane and titanium tetrachloride were simultaneously added and further coground for 42 hours to obtain a yellow solid with a titanium content of 2.1%.

EXAMPLE 4

Preparation of Titanium-Containing Solid

Preparation of a titanium-containing solid was carried out by repeating the procedures of Example 2 (Components, Ratio thereof, Mill Pot, etc.) except changing the contacting method as in the following:

Firstly, anhydrous magnesium chloride and hexachloroethane were charged in the mill pot and subjected to a previous cogrinding treatment for 3 hours. Then, an equimolar complex of titanium tetrachloride and ethyl benzoate was further added thereto and coground for 42 hours, thus obtaining a yellow solid with a titanium content of 2.2%.

Activation Treatment

The activation treatment of Example 1 was repeated except using the above-described titanium-containing solid to obtain a light yellow solid containing 1.6% of Ti.

Polymerization Example 9

The polymerization test of Polymerization Example 3 (Table I) was repeated except using the titanium catalyst component of Example 3 (after the activation treatment), thus obtaining polymerization results of a C.E. of 215 Kg PP/g-Ti and H.I. of 93.5%.

Polymerization Comparative Example 9

The polymerization test of Polymerization Example 3 (Table I) was repeated except using the titanium-containing solid prepared in Example 3. Polymerization results were: C.E.=98 Kg PP/g-Ti; H.I.=89.0%.

Polymerization Example 10

The polymerization test of Polymerization Example 3 (Table I) was repeated except using the titanium catalyst component of Example 4 (after the activation treatment). Polymerization results were: C.E.=198 PP Kg/g-Ti; H.I.=93.8%.

Polymerization Comparative Example 10

The polymerization test of Polymerization Example 3 (Table I) was repeated except using the titanium-containing solid prepared in Example 4, thus obtaining polymerization results of a C.E. of 95 Kg PP/g-Ti and H.I. of 89.3%.

Polymerization Examples 9 and 10 confirm that even if the method or order of treating the components composing the supported titanium catalyst is changed, the catalysts exhibit substantially the similar performance, although there are some fluctuations.

EXAMPLES 5 TO 8

A cogrinding treatment was carried out in an analogous manner to Example 2 except using various organo halogen compounds instead of the hexachloroethane, and an activation treatment was carried out in an analogous manner to Example 1 except using the thus obtained titanium-containing solid, thus obtaining results as shown in Table III.

TABLE III

| Example No. | 5 | 6 | 7 | 8 |
|---|---|---|---|---|
| Grinding |  |  |  |  |
| Organo Halogen Compound | $CCl_4$ | $ClHC=CCl_2$ | $C_6Cl_6$ | $Cl-O-CCl_2$ |
| Grinding Time, hr. | 44 | 44 | 44 | 44 |
| Properties |  |  |  |  |
| Color | Yellow Green | Yellow Green | Yellow | Green |
| Ti-content, % | 2.7 | 3.6 | 2.3 | 3.0 |
| Activation Treatment |  |  |  |  |
| Coground Product, g | 8.4 | 6.2 | 4.5 | 3.9 |
| $C_2Cl_6$, g | 13.0 | 9.6 | 6.3 | 6.0 |
| n-Heptane, ml | 84 | 62 | 45 | 40 |
| Properties |  |  |  |  |
| Color | White | White | Light Yellow | Blue Gray |
| Ti-content, % | 1.0 | 1.0 | 1.2 | 1.2 |

Polymerization Examples 11 to 14 and Comparative Polymerization Examples 11 to 14

Polymerization of propylene runs were carried out in accordance with the procedure described for Polymerization Examples 1–8, and as specified in Tables IV and IVb using catalyst systems composed of various titanium catalyst components obtained in the above described Examples 5 to 8, both before or after the activation treatment, and an organo aluminum catalyst component, thus obtaining results shown in Tables IVa and IVb. It is apparent from Tables IVa and IVb that when other organo ahligen compounds then hexachloroethane are added during cogringing, H.I. is somewhat high, but C.E. is lower (Comparative Polymerization Examples 11–14). However, when the activation treatment is once carried in the titanium catalyst component preparation, both H.I. and C.E. can remarkably be improved (Polymerization Examples 11–14).

TABLE IVa

| Polymerization Example No. | 11 | 12 | 13 | 14 |
|---|---|---|---|---|
| Ti Cat Component |  |  |  |  |
| Preparation Example No. | Ex. 5 | Ex. 6 | Ex. 7 | Ex. 8 |
| Ti Support Ratio (%) | 1.0 | 1.0 | 1.2 | 1.2 |
| Amount of Cat (mg) | 36.5 | 45.7 | 38.5 | 39.7 |
| Organo Aluminum Cat Component |  |  |  |  |
| Organo Al Compound | TIBAL | TIBAL | TIBAL | TIBAL |
| Al/Ti (molar ratio) | 300 | 300 | 300 | 300 |
| Al/E.B. (molar ratio) | 3.4 | 3.4 | 3.4 | 3.4 |
| Polymerization Results |  |  |  |  |
| C.E. (PP Kg/g-Ti) | 123 | 146 | 195 | 81 |
| H.I. (%) | 94.4 | 95.0 | 93.9 | 92.2 |
| M.F.R. | 2.9 | 3.1 | 3.5 | 3.3 |

TABLE IVb

| Comparative Polymerization Example No. |  |  |  |  |
|---|---|---|---|---|
| Ti Cat Component |  |  |  |  |
| Preparation Example No. | Ex. 5, Ti-containing solid | Ex. 6, Ti-containing solid | Ex. 7, Ti-containing solid | Ex. 8, Ti-containing solid |
| Ti Support Ratio (%) | 2.7 | 3.6 | 2.3 | 3.0 |
| Amount of Cat (mg) | 36.5 | 45.7 | 60.3 | 46.7 |
| Organo Aluminum Cat Component |  |  |  |  |
| Organo Al Compound | TIBAL | TIBAL | TIBAL | TIBAL |
| Al/Ti (molar ratio) | 300 | 300 | 300 | 300 |
| Al/E.B. (molar ratio) | 3.4 | 3.4 | 3.4 | 3.4 |
| Polymerization Results |  |  |  |  |
| C.E. (PP Kg/g-Ti) | 73.3 | 81.9 | 98 | 43.7 |
| H.I. (%) | 90.2 | 93.7 | 87.8 | 88.0 |
| M.F.R. | 3.1 | 2.8 | 2.7 | 2.7 |

EXAMPLE 9

The procedure of Example 5 was repeated except a mixed xylene solution of hexachlorobenzene was used in place of the n-heptane solution of hexachloroethane in the activation treatment of the titanium-containing solid of Example 5, thus obtaining a light red brown solid having a Ti content of 1.1%.

Polymerization Example 15

The polymerization test of Polymerization Example 3 was repeated except using the titanium catalyst component of Example 9. Polymerization results were: C.E.=205 Kg PP/g-Ti; H.I.=93.5%, M.F.R.=3.2.

EXAMPLE 10

A yellow solid containing 2.3% of Ti was obtained by the similar cogrinding treatment to that of Example 2 except using ethyl p-anisate in place of the ethyl benzoate. The resulting titaium-containing solid was then subjected to the activation treatment to Example 1, thus obtaining a light yellow solid containing 1.5% of Ti.

Polymerization Example 16

The polymerization test of Polymerization Example 3 was repeated, but using as the titanium catalyst component, the supported titanium catalyst obtained in Example 10. Polymerization test results were: C.E.=226 Kg PP/g-Ti; H.I.=95.0%.

Comparative Polymerization Example 15

The polymerization test of Polymerization Example 3 was repeated except using the titanium-containing solid obtained in Example 10 (before activation treatment) as the titanium catalyst component, thus obtaining polymerization results of a C.E. of 103 Kg PP/g-Ti and H.I. of 91.1%.

EXAMPLE 11

The cogrinding treatment of Example 2 was carried out except using isobutyl isobutyrate in place of the ethyl benzoate to obtain a yellow solid containing 2.5% of Ti. Then, activation treatment was carried out in an analogous manner to Example 1 except using this titanium-containing solid, thus obtaining a light yellow solid containing 1.3% of Ti.

Polymerization Example 17

The polymerization test of Polymerization Example 3 was repeated except using, as the titanium catalyst component the supported titanium catalyst obtained after the activation treatment in Example 11. Polymerization test results obtained were a C.E. of 156 Kg PP/g-Ti and H.I. of 92.5%.

Comparative Polymerization Example 16

The polymerization test of Polymerization Example 3 was repeated except using the titanium-containing solid obtained in Example 11 (before activation treatment) as the titanium catalyst component. C.E.=83 Kg PP/g-Ti; H.I.=89.5%.

EXAMPLE 12

The activation treatment of Example 1 was repeated except using the titanium-containing solid of Example 1 and n-heptane only in place of the n-heptane solution of hexachloroethane, thus obtaining a light yellow solid containing 1.3% of Ti.

EXAMPLE 13

The activation treatment of Example 12 was repeated except using toluene in place of the n-heptane, thus obtaining a light red brown solid containing 1.1% of Ti.

Polymerization Example 18

The polymerization test of Polymerization Example 2 was repeated except using, as the titanium catalyst component, the product of Example 13. The C.E. was 215 Kg PP/g-Ti and the resulting polypropylene showed a H.I. of 93.8% and M.F.R. of 2.8.

EXAMPLE 14

Additional titanium-containing solid was further prepared in accordance with the procedure of Example 2.

Activation Treatment (1)

A sample of the above-described titanium-containing solid was then subjected to the similar activation treatment to that of Example 1, thus obtaining a light yellow solid containing 2.0% of Ti.

Activation Treatment (2)

The activation treatment of Example 1 was carried out except using a sample of the above-described titanium-containing solid and a mixed xylene solution of hexachloroethane in place of the n-heptane solution of hexachloroethane, thus obtaining a light brown solid containing 2.0% of Ti.

Then, polymerization examples will be given in which various organic acid esters were used with an organo aluminum compounds as the organo aluminum catalyst component.

Polymerization Example 20

The polymerization test of Polymerization Example 2 was repeated except using ethyl p-anisate in place of the ethyl benzoate in the organo aluminum catalyst component. The C.E. was 422 Kg PP/g-Ti and the resulting polypropylene had an H.I. of 92.1%.

Polymerization Example 21

35.6 mg of the titanium catalyst component obtained in Activation Treatment (1) of Example 14, a solution of 1 mol/l of triisobutylaluminum in n-heptane corresponding to an Al/Ti ratio of 300 and ethyl p-toluate corresponding to an Al/Ester ratio of 43.5 were previously mixed, held for 5 minutes and charged in an autoclave. Then, predetermined quantities of hydrogen gas and liquid propylene were added thereto under pressure and polymerization was carried out at 68° C. for 30 minutes in accordance with Polymerization Examples 1–8. After the polymerization reaction, treatment per polymerization Examples 1–8 was carried out to obtain 224 g of powdered polypropylene with a C.E. of 313 Kg PP/g-Ti and H.I. of 92.2%.

Polymerization Example 22

The polymerization test of Polymerization Example 3 was repeated except using the titanium catalyst component obtained by Activation Treatment (1) of Example 14 and ethyl p-anisate in place of the ethyl benzoate in the organo aluminum catalyst component. The C.E. was 255 Kg PP/g-Ti and the resulting polypropylene had an H.I. of 90.5%.

Polymerization Example 23

The polymerization test of Polymerization Example 3 was repeated except using the titanium catalyst component obtained by Activation Treatment (2) of Example 14, thus obtaining a C.E. of 230 Kg PP/g-Ti and H.I. of 91.8% as to the resulting polypropylene.

An example of solution polymerization will hereinafter be given.

Polymerization Example 24

24 mg of the titanium catalyst component of Example 1, 1 mol/l of triisobutylaluminum corresponding to an Al/Ti molar ratio of 300 and E.B. corresponding to an Al/E.B. molar ratio of 3.4 were previously mixed and held for 5 minutes in a nitrogen atmosphere in an autoclave. Then, 0.3 l of hydrogen gas, 0.4 l of liquid propylene and 0.5 l of n-heptane were added thereto and polymerization was carried out by raising the temperature to 68° C. for 30 minutes. After the polymerization, the unreacted propylene was purged and the solvent was removed by stripping with steam, followed by drying the so obtained polymer at 70° C. in a nitrogen atmosphere. The C.E. was 185 Kg Pp/g-Ti and the resulting polypropylene had an H.I. of 96% and M.F.R. of 2.9.

Polymerization Example 25

The polymerization test of Polymerization Example 3 was repeated except adding 4.5 g of ethylene gas. The C.E. was 340 Kg Copolymer/g-Ti and the resulting copolymer showed an H.I. of 88%, ethylene content of 2.9% and M.F.R. of 2.9.

EXAMPLE 15

Preparation of Titanium-Containing Solid

The procedure of Example 2 was repeated to give a yellow solid having a titanium content of 2.7%.

Activation Treatment

An activation treatment was carried out in an analogous manner to Activation Treatment (1) of Example 2, except using the titanium-containing solid described above and silicon tetrachloride in place of the hexachloroethane, thus obtaining a thin yellow solid containing 1.8% of Ti.

Polymerization Example 26

The polymerization test of Polymerization Example 3 was repeated except using the titanium catalyst component of Example 15, thus obtaining polymerization results of a C.E. of 145 Kg PP/g-Ti and H.I. of 93.1%.

EXAMPLE 16

Preparation of Titanium-Containing Solid

A cogrinding treatment was carried out in an analogous manner to Example 2 except using carbon tetrabromide in place of the hexachloroethane, thus obtaining a flowable canary yellow solid containing 3.1% of Ti.

Activation Treatment

The activation treatment was carried out in an analogous manner to Activation Treatment (1) of Example 2, thus obtaining a somewhat light canary yellow solid containing 2.3% of Ti.

Polymerization Example 27

The polymerization test of Polymerization Example 3 was repeated except using the titanium catalyst component of Example 16. Polymerization results were: C.E.=127 Kg Pp/g-Ti; H.I.=93.1%.

Comparative Polymerization Example 16

The polymerization test of Polymerization Example 3 was repeated except using the titanium-containing solid of Example 16 (before activation treatment) as the titanium catalyst component. Polymerization results: C.E.=142 Kg PP/g-Ti; H.I.=90.7%.

What we claim is:

1. A supported titanium catalyst adaptable for use in stereoregular polymerization of α-olefins, produced by a process comprising:

cogrinding, in combination, a magnesium halide, a tetravalent titanium halide, an ester of a saturated or unsaturated aliphatic, alicyclic and aromatic mono- or polycarboxylic acid and an aliphatic, alicyclic and araliphatic mono- or polyols and a halogen compound selected from halogen-substituted hydrocarbons, halo-substituted oxygen-containing organocarbon compounds and halogen-containing compounds of Group IVa elements selected from the group consisting of $Si_qX_{2q+2}$, $GeX_m$, $SnX_m$ and $PbX_m$ wherein X is a halogen, alkyl, aryl, alkylaryl, vinyl, alkoxy and acyl, at least one X being halogen, q is an integer of 1 to 10 and m is an integer of 2 or 4, to obtain a titanium-containing solid product, wherein the intensity of the X-ray diffraction peak at 14.8° is dull and the intensity of the 30.2° is reduced compared to the characteristic X-ray diffraction lines of normal magnesium halide;

treating said titanium-containing solid product by contacting under activating conditions with an activating amount of a compound selected from a hydrocarbon, halogen-substituted hydrocarbons, halo-substituted oxygen-containing organocarbon compounds and halogen-containing compounds of Group IVa elements selected from the group consisting of $Si_qX_{2q+2}$, $GeX_m$, $SnX_m$ and $PbX_m$ and mixtures thereof; and recovering the resulting treated solid product as said supported titanium catalyst.

2. The supported titanium catalyst of claim 1, wherein the halogen-substituted hydrocarbon is a polychloro aliphatic hydrocarbon having 1 to 4 carbon atoms.

3. The supported titanium catalyst of claim 1, wherein the halogen compound, in the treatment of the titanium-containing solid product, is a halogen-substituted hydrocarbon.

4. The supported titanium catalyst of claim 1, wherein the hydrocarbon, in the treatment of the titanium-containing solid product, is selected from the group consisting of aliphatic hydrocarbons having 3 to 20 carbon atoms, alicyclic hydrocarbons having 5 to 12 carbon atoms, and aromatic hydrocarbons having 6 to 12 carbon atoms.

5. The supported titanium catalyst of claim 4, wherein the titanium-containing solid product is treated with a mixture of said hydrocarbon and a halogen-substituted hydrocarbon.

6. The supported titanium catalyst of claim 5, wherein the halogen-substituted hydrocarbon is a polychloro-substituted aliphatic hydrocarbon having 1 to 4 carbon atoms.

7. The supported titanium catalyst of claim 1, wherein said treatment of the titanium-containing solid product is carried out with heating at about 40° C. to about 200° C. for about 0.5 to 20 hours.

8. The supported titanium catalyst of claim 1, wherein, in the cogrinding, the magnesium halide is anhydrous magnesium dichloride, the tetravalent titanium halide is titanium tetrachloride, and the ester is selected from alkyl esters of aliphatic, alicyclic and aromatic carboxylic acids.

9. The supported titanium catalyst of claim 8, wherein the ester is selected from a $C_1$-$C_8$ alkyl ester of benzoic acid or derivative thereof.

10. The supported titanium catalyst of claim 9 wherein the combination is coground until there is produced a change of intensity in the peaks of 14.8° (strong) and 30.2° (middle) of the characteristic peaks ($2\theta$) in the x-ray diffraction (45 KV×45 mA, $CuK_\alpha$ source, Ni filter) of anhydrous magnesium dichloride employed.

11. The supported titanium catalyst of claim 10, wherein, in the cogrinding, the titanium tetrachloride is employed in an amount sufficient to provide about 0.1 to 10% by weight as supported titanium metal in the resulting titanium-containing solid product, the ester is employed in a proportion of about 0.1 to about 10 mols per 1 gram atoms of supported titanium metal, and the halogen compound is employed in a proportion of about 5 to 50% by weight to the anhydrous magnesium dichloride.

12. The supported titanium catalyst of claim 11, wherein, in the cogrinding, the halogen compound is a polychloro-substituted aliphatic hydrocarbon having 1 to 4 carbon atoms, and, in the treatment, said titanium-containing solid product is contacted with a mixture of a hydrocarbon and a halogen-substituted hydrocarbon with heating at about 80° C. to about 150° C. for about 1 to 5 hours, said hydrocarbon and halogen-substituted hydrocarbon, respectively, being employed in proportions of about 5 to 50 and about 0.5 to 50 times the weight of the titanium-containing solid product.

13. The supported titanium catalyst of claim 12, wherein, in the treatment, the halogen-substituted hydrocarbon is a polychloro-substituted aliphatic hydrocarbon having 1 to 4 carbon atoms.

14. The supported titanium catalyst of claim 13, wherein the polychloro-substituted hydrocarbon in the cogrinding and the treatment is hexachloroethane.

15. A catalyst system adaptable for use in stereoregular polymerization of α-olefins which comprises a mixture of:
(a) an organo aluminum catalyst component prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 1.

16. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 2.

17. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 3.

18. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 4.

19. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catayst of claim 5.

20. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 6.

21. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 7.

22. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and
(b) the supported titanium catalyst of claim 12.

23. A catalyst system adaptable for use in stereoregular polymerization of α-olefins which comprises a mixture of:
(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and (b) the supported titanium catalyst of claim 13.

24. A catalyst system adaptable for use in stereoregular polymerization of α-olefins which comprises a mixture of:

(a) an organo aluminum catalyst component, prepared by mixing an organo aluminum compound and an ester of a saturated or unsaturated aliphatic, alicyclic and aromatic mono- or polycarboxylic acid and an aliphatic, alicyclic and araliphatic mono- or polyols; and (b) the supported titanium catalyst of claim 14.

* * * * *